(12) United States Patent
Wei et al.

(10) Patent No.: US 12,250,578 B2
(45) Date of Patent: Mar. 11, 2025

(54) PHYSICAL DOWNLINK CONTROL CHANNEL (PDCCH) AGGREGATION ACROSS MONITORING OCCASIONS

(71) Applicant: QUALCOMM Incorporated, San Diego, CA (US)

(72) Inventors: Chao Wei, Beijing (CN); Huilin Xu, Temecula, CA (US); Jing Lei, San Diego, CA (US); Qiaoyu Li, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 276 days.

(21) Appl. No.: 17/759,347

(22) PCT Filed: Apr. 3, 2020

(86) PCT No.: PCT/CN2020/083112
§ 371 (c)(1),
(2) Date: Jul. 22, 2022

(87) PCT Pub. No.: WO2021/196148
PCT Pub. Date: Oct. 7, 2021

(65) Prior Publication Data
US 2023/0054454 A1 Feb. 23, 2023

(51) Int. Cl.
*H04W 24/08* (2009.01)
*H04W 72/1273* (2023.01)

(52) U.S. Cl.
CPC ....... *H04W 24/08* (2013.01); *H04W 72/1273* (2013.01)

(58) Field of Classification Search
CPC .. H04W 24/08; H04W 72/1273; H04L 5/0053
See application file for complete search history.

(56) References Cited

U.S. PATENT DOCUMENTS

| 10,547,429 B2 | 1/2020 | John Wilson et al. |
| 2019/0268206 A1 | 8/2019 | Yang et al. |

(Continued)

FOREIGN PATENT DOCUMENTS

| CN | 110324127 A | 10/2019 |
| CN | 110474737 A | 11/2019 |

(Continued)

OTHER PUBLICATIONS

Supplementary European Search Report—EP20928588—Search Authority—The Hague—Dec. 11, 2023.

(Continued)

*Primary Examiner* — Christine Ng
(74) *Attorney, Agent, or Firm* — Patterson & Sheridan LLP

(57) ABSTRACT

Certain aspects of the present disclosure provide techniques for physical downlink control channel (PDCCH) aggregation across monitoring occasions. A method that may be performed by a user equipment (UE) includes determining a policy for monitoring one or more physical downlink control channels (PDCCHs), wherein the policy allows for mapping control channel elements (CCEs) of a single PDCCH candidate across multiple PDCCH monitoring occasions; and monitoring for signals from a network entity via the one or more PDCCHs according to the determined policy.

13 Claims, 11 Drawing Sheets

(56) References Cited

U.S. PATENT DOCUMENTS

| | | | |
|---|---|---|---|
| 2020/0022144 A1* | 1/2020 | Papasakellariou | H04W 72/23 |
| 2020/0084739 A1* | 3/2020 | Si | H04L 5/0048 |
| 2020/0259896 A1* | 8/2020 | Sachs | H04W 56/0065 |
| 2020/0280971 A1* | 9/2020 | Moon | H04L 5/0053 |
| 2020/0396686 A1* | 12/2020 | Tiirola | H04W 52/0229 |
| 2021/0037603 A1* | 2/2021 | Li | H04L 1/189 |
| 2021/0235339 A1* | 7/2021 | Babaei | H04W 36/06 |
| 2021/0266909 A1* | 8/2021 | Lin | H04L 5/0053 |
| 2021/0385826 A1* | 12/2021 | Moon | H04L 5/0053 |

FOREIGN PATENT DOCUMENTS

| | | |
|---|---|---|
| CN | 110474755 A | 11/2019 |
| CN | 110505642 A | 11/2019 |
| EP | 4017070 A1 | 6/2022 |
| WO | 2018148002 | 8/2018 |
| WO | 2019099388 A1 | 5/2019 |
| WO | 2019216599 A1 | 11/2019 |

OTHER PUBLICATIONS

Hua Wet et aJ. Correction on PDCCH candidate colliding wit11 RB-symbol level RMR in TS38.213 3GPP TSG-RAN WGI Meeting #100-e RI-2001100 Feb. 15, 2020(Feb. 15, 2020) section 10. I.

Intel Corporation On NR PDCCH repetitions for URLLC 3GPP TSG RAN WGI Meeting #92bis RI-1804741 Apr. 7, 2018(Apr. 7, 2018) section 3.

3GPP 3rd Generation Partnership Project; Technical Specification Group Radio Access Network; NR. Physical layer procedures for control(Release 16) 3GPP TS 38.213 VI6.0.0 Jan. 14, 2020 (Jan. 14, 2020).

International Search Report issued to PCT/CN2020/083112 on Jan. 4, 2021.

* cited by examiner

PHYSICAL DOWNLINK CONTROL CHANNEL (PDCCH) AGGREGATION ACROSS MONITORING OCCASIONS

BACKGROUND

Field of the Disclosure

Aspects of the present disclosure relate to wireless communications, and more particularly, to techniques for physical downlink control channel (PDCCH) aggregation across monitoring occasions, which may be desirable for reduced capability or low complexity user equipment.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include PDCCH transmission and monitoring policies desirable for reduced complexity UEs or low complexity UEs.

Certain aspects of the subject matter described in this disclosure can be implemented in a method for wireless communication by a user equipment (UE). The method generally includes: determining a policy for monitoring one or more physical downlink control channels (PDCCHs), wherein the policy allows for mapping control channel elements (CCEs) of a single PDCCH candidate across multiple PDCCH monitoring occasions; and monitoring for signals from a network entity via the one or more PDCCHs according to the determined policy.

Certain aspects of the subject matter described in this disclosure can be implemented in a method for wireless communication by a network entity. The method generally includes: determining a policy for transmitting signals via one or more physical downlink control channels (PDCCHs), wherein the policy allows for mapping control channel elements (CCEs) of a single PDCCH candidate across multiple PDCCH monitoring occasions; and transmitting the signals to the UE via the one or more PDCCHs according to the determined policies.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
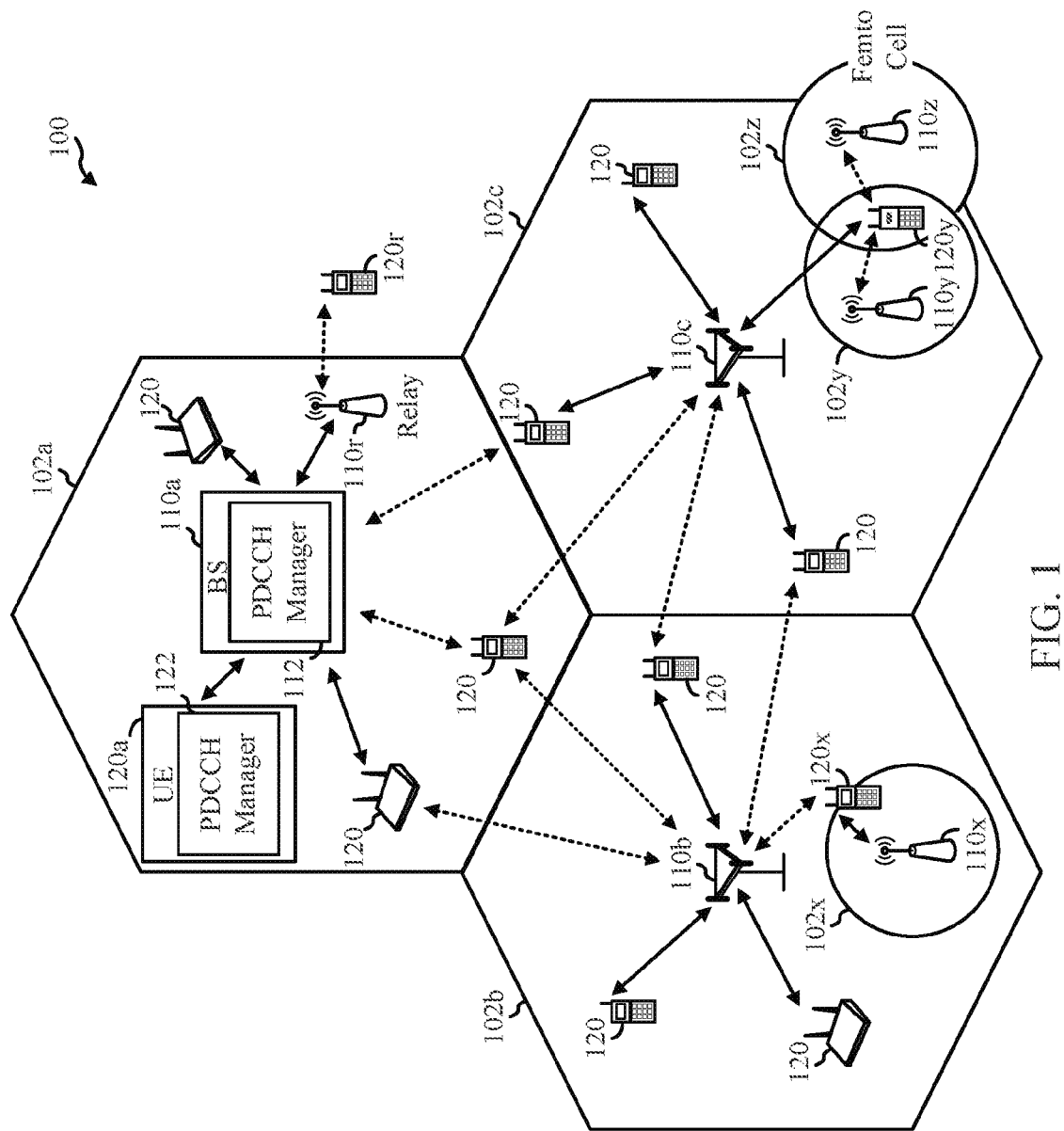
FIG. 1 is a block diagram conceptually illustrating an example wireless communication network, in accordance with certain aspects of the present disclosure.
Figure 1:
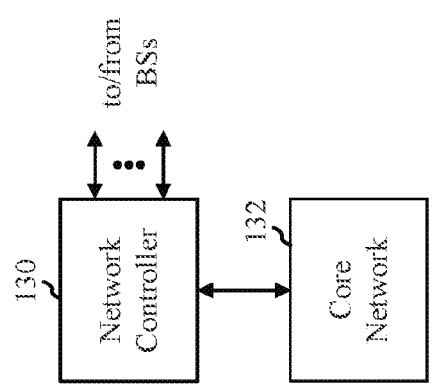

Aspects of the present disclosure provide apparatus, methods, processing systems, and computer readable mediums for physical downlink control channel (PDCCH) aggregation across PDCCH monitoring occasions. The various policies described herein may improve PDCCH monitoring and reduce PDCCH blocking for reduced capability UEs.

The following description provides examples of PDCCH monitoring in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., e.g., 24 GHz to 53 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network).

As shown in FIG. 1, the BS 110*a* includes a PDCCH manager 112 that applies the various policies for PDCCH monitoring for reduced capability UEs, in accordance with aspects of the present disclosure. The UE 120*a*, as a reduced capability UE, includes a PDCCH manager 122 that applies the various policies for monitoring the PDCCH, in accordance with aspects of the present disclosure.

As illustrated in FIG. 1, the wireless communication network 100 may include a number of BSs 110*a-z* (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. A BS may support one or multiple cells.

The BSs 110 communicate with UEs 120*a-y* (each also individually referred to herein as UE 120 or collectively as UEs 120) in the wireless communication network 100. The UEs 120 (e.g., 120*x*, 120*y*, etc.) may be dispersed throughout the wireless communication network 100, and each UE 120 may be stationary or mobile. Wireless communication network 100 may also include relay stations (e.g., relay station 110*r*), also referred to as relays or the like, that receive a transmission of data and/or other information from an upstream station (e.g., a BS 110*a* or a UE 120*r*) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
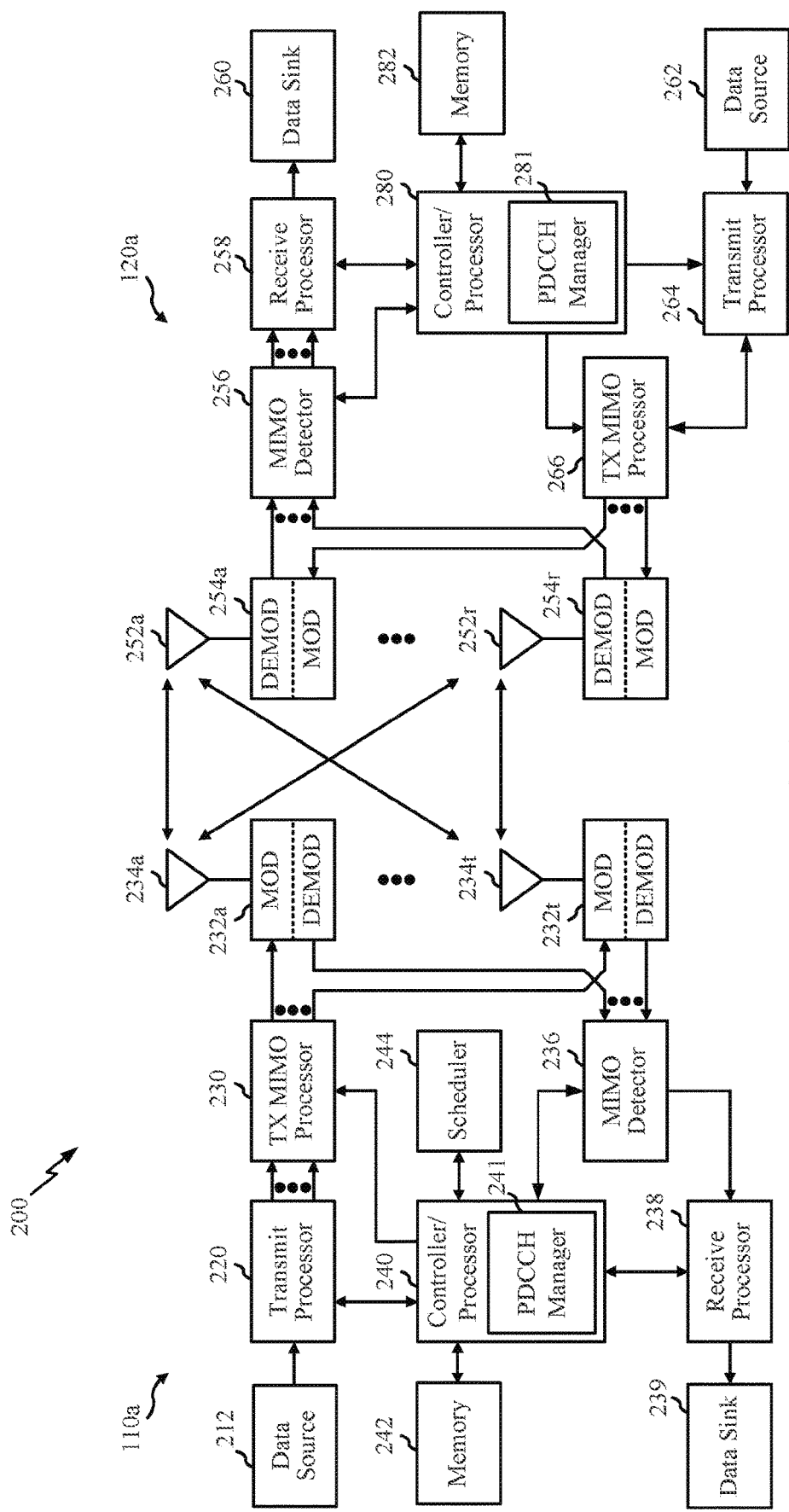
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has a PDCCH manager 241 that applies the various policies for PDCCH monitoring for a reduced capability UE, according to aspects described herein. As shown in FIG. 2, the controller/processor 280 of the UE 120a has a PDCCH manager 281 that applies the various policies for PDCCH monitoring, according to aspects described herein. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
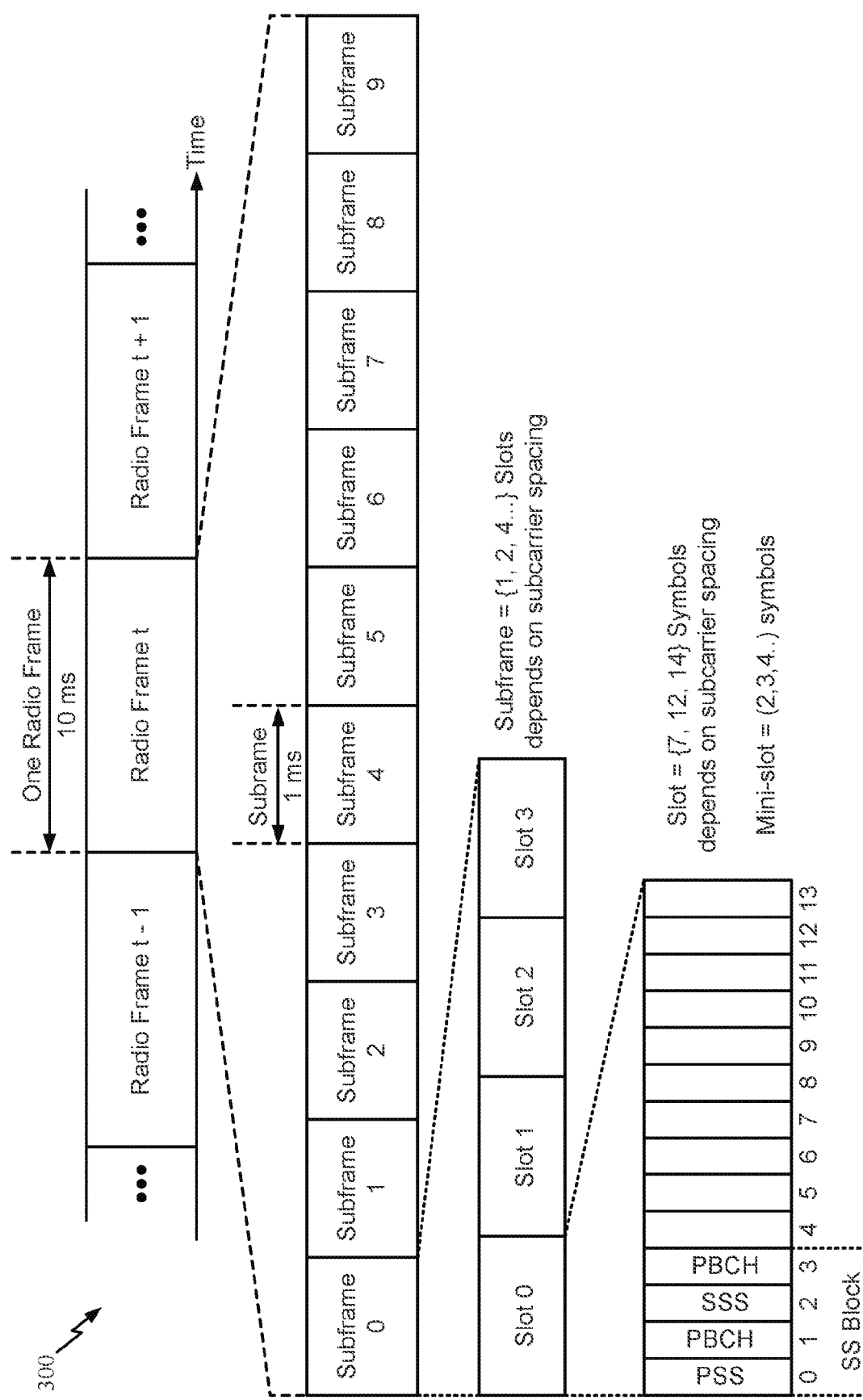
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . slots) depending on the SCS. Each slot may include a variable number of symbol periods (e.g., 7, 12, or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

Figure 4:
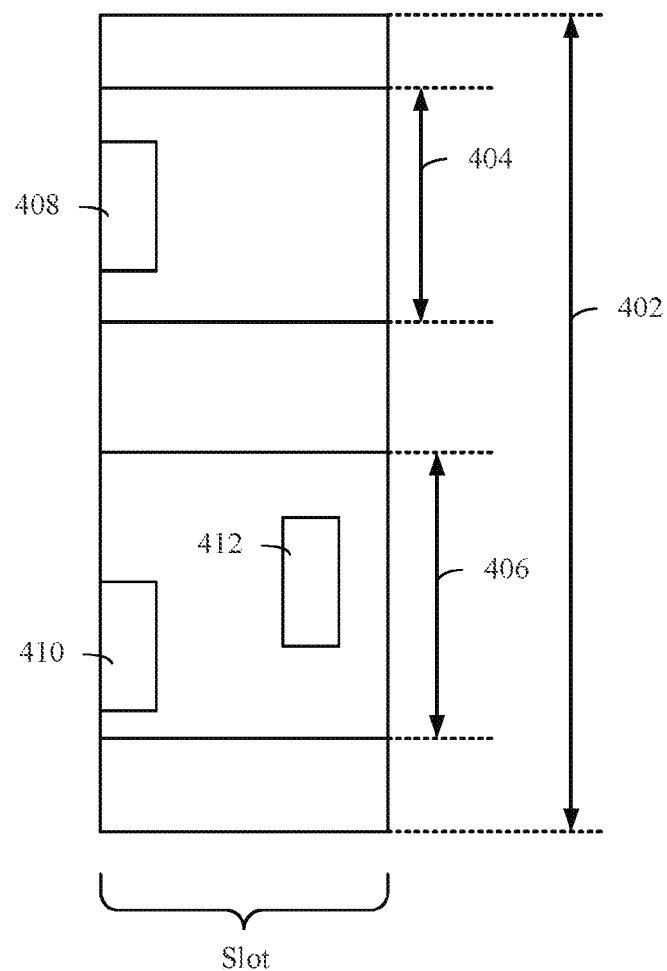
FIG. 4 is an example of control regions for certain wireless communication systems (e.g., NR), in accordance with certain aspects of the present disclosure.

FIG. 4 is a diagram showing an example of control resource sets (CORESETs) within a carrier bandwidth across a slot in NR. As shown, a carrier bandwidth (CBW) 402 may have multiple bandwidth parts (BWPs) 404, 406 at various subcarrier spacings (SCS). In this example, the BWP 404 is configured with a single CORESET 408, and the BWP 406 is configured with CORESETs 410, 412. In aspects, a BWP may be configured with multiple CORESETs. Each of the CORESETs 408, 410, 412 include a set of physical resources within a specific area in downlink resource grid and are used, for example, to carry downlink control information (DCI). In a CORESET, the set of resource blocks (RBs) and the number of consecutive OFDM symbols in which the CORESET is located are configurable with CORESET configuration and time domain location of the OFDM symbols is configurable with corresponding PDCCH search space (SS) set(s). A search space set may be configured with a type of SS set (e.g., common search space (CSS) set or a UE-specific search space (USS) set), a DCI format to be monitored, a monitoring occasion, and the number of PDCCH candidates for each aggregation level (AL) in the SS set. In other words, a search space set is a set of one or more search spaces, where each search space corresponds to an AL (e.g., the number of control channel elements for a PDCCH candidate). The configuration flexibilities of control regions (i.e., CORESETs and associated search space sets) including time, frequency, numerologies, and operating points enable NR to address a wide range of use cases for control signaling (e.g., various desired latencies and/or various channel conditions). In certain wireless communication systems (e.g., LTE), the PDCCH is allocated across an entire system bandwidth, whereas an NR PDCCH is transmitted in the CORESET(s) of an active BWP, for example, the CORESETs 410, 412 of BWP 406.

Example PDCCH Aggregation across Monitoring Occasions for UEs with Reduced Capability Certain wireless communication systems (e.g., 5G NR systems) provide services with relatively high data rates and low latencies (such as eMBB and/or URLLC), which may result in a large UE form factor, high UE hardware costs, high UE complexity (e.g., memory, processor, and/or transceiver circuits), and/or high UE power consumption. 5G NR systems also provide very flexible PDCCH monitoring configurations, e.g., fully configurable time resources, frequency resources, and periodicity pattern for PDCCH monitoring, as described herein with respect to FIG. 4. Under the flexible PDCCH monitoring regime, 5G NR systems provide a relatively large number of potential PDCCH decodes with multiple CORESETs and SS sets and flexible quasi colocation (QCL) configuration (in the form of transmission configuration indicator (TCI) states) for the tracking of channel variations. As such, the PDCCH monitoring configuration of a UE plays a role in determining the complexity of a UE, such as the form factor, hardware costs, circuit complexity, and/or power consumption.

5G NR systems may also provide services for reduced capability UEs. In certain cases, the reduced capability UE may have reduced processing capabilities (e.g., reduced memory or processing times) and/or transceivers with lower complexity (e.g., fewer transmit and/or receive paths). As a result, the reduced capability UE may have a smaller form factor, lower hardware costs, lower circuit complexity, and/or lower power consumption than UEs supporting higher data rates and/or lower latency. As an example, a reduced capability UE may be a wearable wireless communication device (such as a smart watch or activity tracker), a video surveillance device, or an industrial Internet-of-Things (IIoT) device.

PDCCH blocking may be a problem for reduced capacity UEs due to a limited total number of CCEs in a CORESET as restricted by maximum UE bandwidth and due to the use of repetition for a larger AL (e.g., repeating AL 8 or AL 16 in multiple monitoring occasions) to compensate coverage loss due to a reduced number of Rx antennas. A similar issue may also occur for dynamic spectrum sharing (DSS) with LTE on the same frequency, where the CORESET length is limited to one symbol to avoid collision with LTE cell specific reference signal (CRS).

Accordingly, embodiments of the present disclosure involve PDCCH aggregation across multiple monitoring occasions to reduce PDCCH blocking when PDCCH capability in a CORESET is limited.

Figure 5:
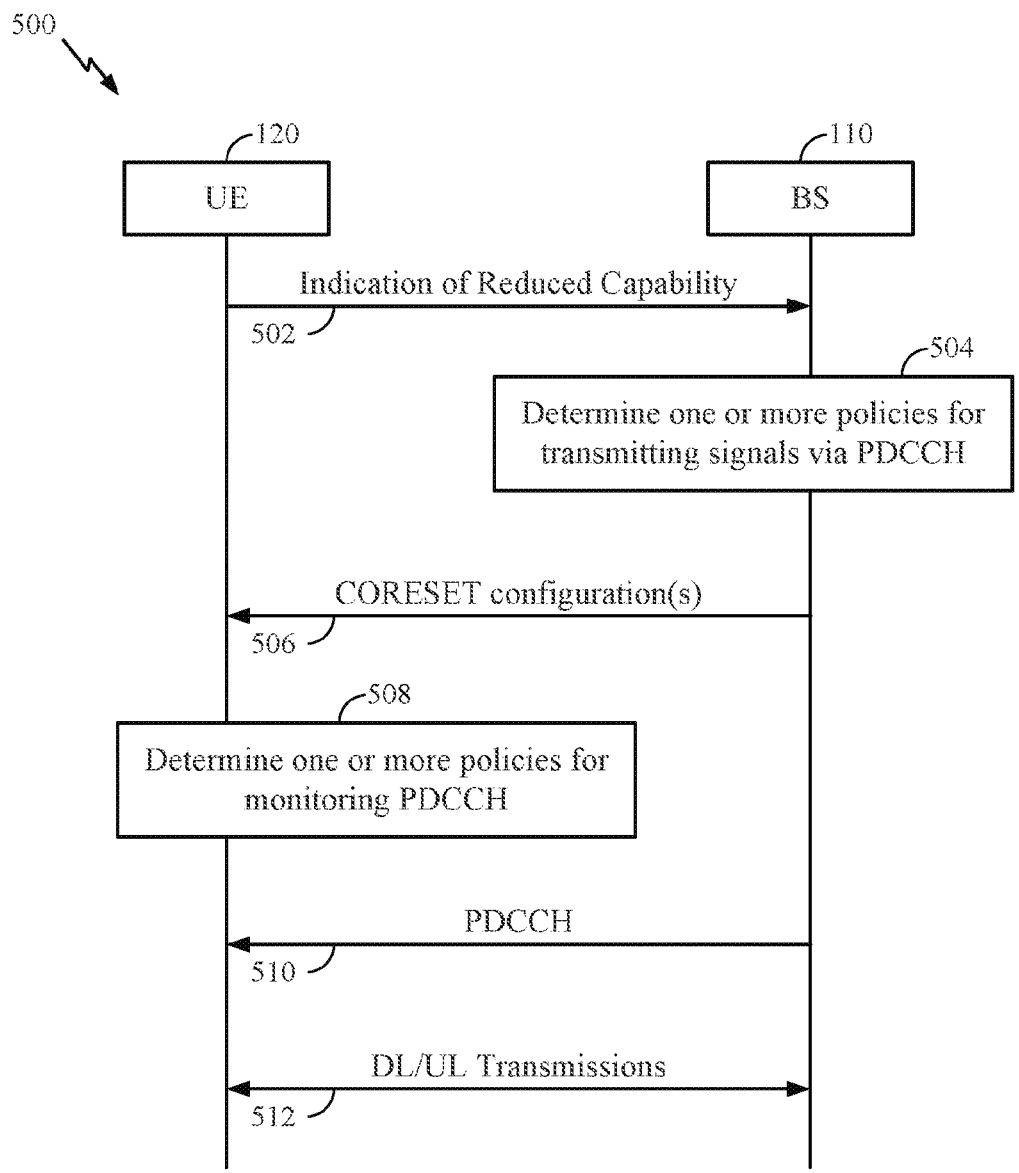
FIG. 5 illustrates a signaling flow for physical downlink control channel (PDCCH) aggregation across monitoring occasions, in accordance with certain aspects of the present disclosure.

FIG. 5 illustrates a signaling flow for PDCCH aggregation across PDCCH monitoring occasions, in accordance with certain aspects of the present disclosure. As shown, at 502, the UE 120 may signal, to the BS 110, an indication that the UE is a reduced capability UE. In certain cases, the indication of the reduced capability may be transmitted via radio resource control (RRC) signaling (e.g., RRC capability information) or RACH signaling (e.g., a specific preamble sequence associated with reduced capability UEs). At 504, the BS 110 may determine one or more policies for configuring the UE 120 for PDCCH monitoring via CORESETs and transmitting and receiving signals on the BWP as further described herein. in some aspects, the BS determines the policy based on a DSS coexistence configuration with LTE on the same carrier frequency. In aspects, the policies for the reduced capability UE may be pre-programmed at the BS 110. In certain cases, at least some of the policies may be included in the indication at 502. That is, the indication at 502 may also include an indication of the PDCCH monitoring capabilities of the UE 120. At 506, the BS 110 may transmit, to the UE 120, one or more CORESET configurations, in accordance with the policies determined at 504. For example, the BS 110 may configure the UE 120 to perform PDCCH aggregation across monitoring occasions as described herein. At 508, the UE 120 may determine the policies for monitoring the PDCCH within the BWP as further described herein. At 510, the UE 120 may monitor the PDCCH transmitted from the BS 110 in accordance with the determined policies. For example, the policies may allow for mapping CCEs of a single PDCCH candidate across multiple PDCCH monitoring occasions (PMOs). In certain cases, the UE 120 may receive downlink or uplink scheduling via the PDCCH at 510, and at 512, the UE 120 may transmit uplink signals or receive downlink signals according to the scheduling.

Figure 6:
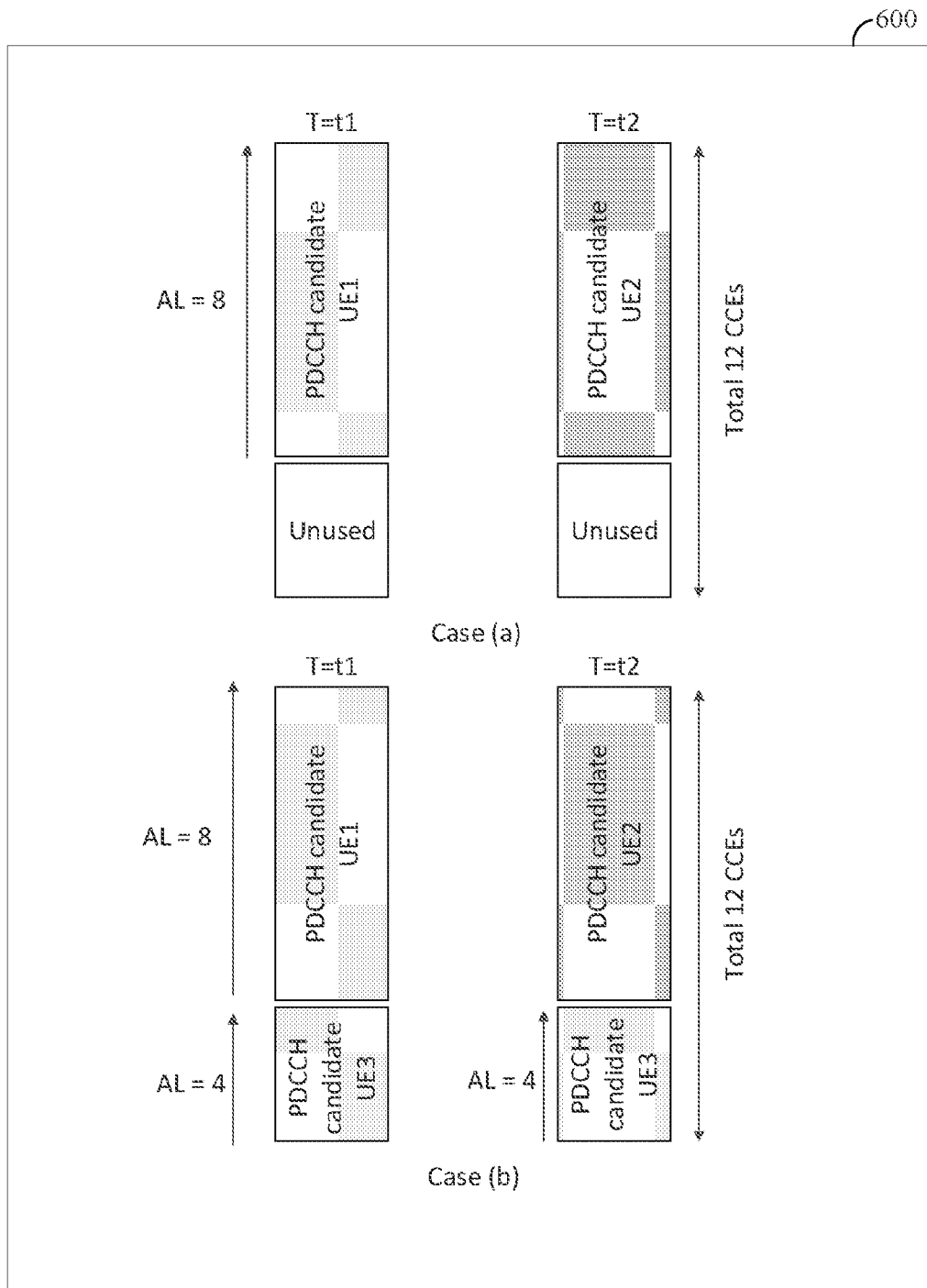
FIG. 6 illustrates an example of PDCCH aggregation across monitoring occasions, in accordance with certain aspects of the present disclosure.

In certain aspects, the PDCCH monitoring policies for a reduced capability UE may include various CORESET policies. In aspects, the CORESET policies may provide that the CCEs of a PDCCH candidate may be mapped across consecutive monitoring occasions. FIG. 6 illustrates an example 600 of PDCCH aggregation across monitoring occasions, in accordance with certain aspects of the present disclosure.

In case (a) of FIG. 6, PDCCH aggregation is not used, while in case (b) PDCCH aggregation is used. PDCCH aggregation as shown in case (b) may reduce PDCCH blocking. For example, assuming a maximum 10 MHz bandwidth and 30 kHz subcarrier spacing (SCS), there is a maximum of 12 CCEs in a CORESET. As such, without aggregation, only one AL8 PDCCH can be transmitted in each PMO, as shown in case (a). This results in unused CCEs in PMOs.

As shown in case (b), CCEs of a PDCCH candidate may be mapped across consecutive monitoring occasions. In case (b), the first 4 CCEs of an AL 8 PDCCH candidate (for UE 3) are mapped to the first PMO at time t1 and the second 4 CCEs are mapped to the second PMO at time t2. Using PDCCH aggregation, up to three AL8 PDCCH can be transmitted in 2 PMOs to 3 UEs, thus reducing blocking by 50%. Aggregating an AL8 PDCCH candidate across two PMOs provides additional performance benefits compared to repeating an AL4 PDCCH candidate in two PMOs, as AL8 PDCCH provides additional coding gain over AL4 PDCCH with two repetitions.

The configuration of PDCCH aggregation is AL specific, e.g. based on an optional number of occasions for PDCCH monitoring ($N_{MO}^{(L)}$). In an example, if the number is one, PDCCH aggregation is not used for the AL. Otherwise, PDCCH aggregation is used and the UE is required to monitor the PDCCH candidate associated with the AL in every $N_{MO}^{(L)}$ non-overlapped consecutive PDCCH occasions. The CCE index for a PDCCH candidate with aggregation is based on the total number of CCEs in the $N_{MO}^{(L)}$ PDCCH monitoring occasions, e.g. using the following equation:

$$L\left\{\left(Y_{p,n_s}^{(L)} + \left\lfloor \frac{m \cdot N_{MO}^{(L)} \cdot N_{CCE,p}}{L \cdot M_s^{(L)}} \right\rfloor\right) \bmod \lfloor N_{MO}^{(L)} \cdot N_{CCE,p}/L \rfloor\right\} + i$$

where the random seed $Y_{p,n_s}^{(L)}$ for USS is given by the starting slot of $N_{MO}^{(L)}$ PDCCH occasions.

Figure 7:
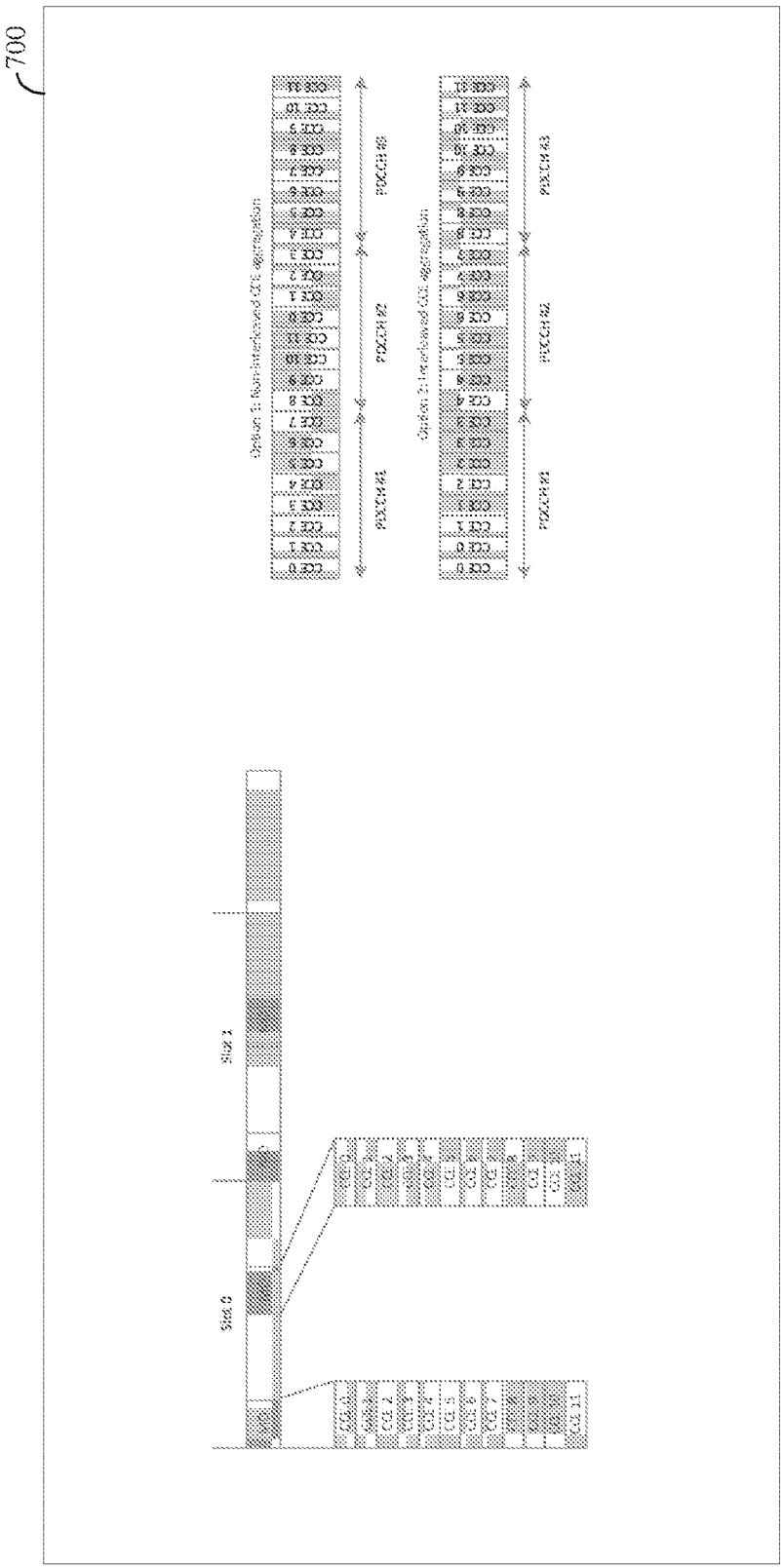
FIG. 7 depicts examples of sequential and interleaved PDCCH aggregation across monitoring occasions, in accordance with certain aspects of the present disclosure.

FIG. 7 depicts an example 700 of sequential and interleaved PDCCH aggregation across monitoring occasions. As shown in example 700, the CCEs in $N_{MO}^{(L)}$ PDCCH monitoring occasions may be aggregated either in sequence or interleaved to create a total $N_{MO}^{(L)} \cdot N_{CCE,p}$ CCEs for determining a PDCCH candidate. In option 1, non-interleaved (e.g., sequential) aggregation is used, as the CCEs of two PMOs (PDCCH monitoring occasions) are aggregated in sequence between three PDCCH candidates. In option 2, interleaved CCE aggregation is used, as the CCEs of two PMOs are aggregated in an interleaved way, and as a result the CCEs of the three PDCCH candidates are interleaved to each other across the two PMOs.

For option 2, it is equivalent to divide the AL L of a PDCCH candidate into $N_{MO}^{(L)}$ parts each in a PMO. This may be accomplished, for example, by dividing an AL 16 into 2×8 CCEs and allocating CCEs for each part in a PMO as if it is an AL $L/N_{MO}^{(L)}$ PDCCH candidate.

PDCCH aggregation can also be applied to Type0-PDCCH CSS set in search space 0 which is configured by master information block (MIB) instead of system information block (SIB) or RRC. PDCCH aggregation for Type0-CSS set can be implicitly determined by the configured size of the associated CORESET0, e.g., used when the set of resource blocks of CORESET0 is equal to 24 RBs or when the total number of CCEs in the CORESET0 is less than or equal to 12.

Figure 8:
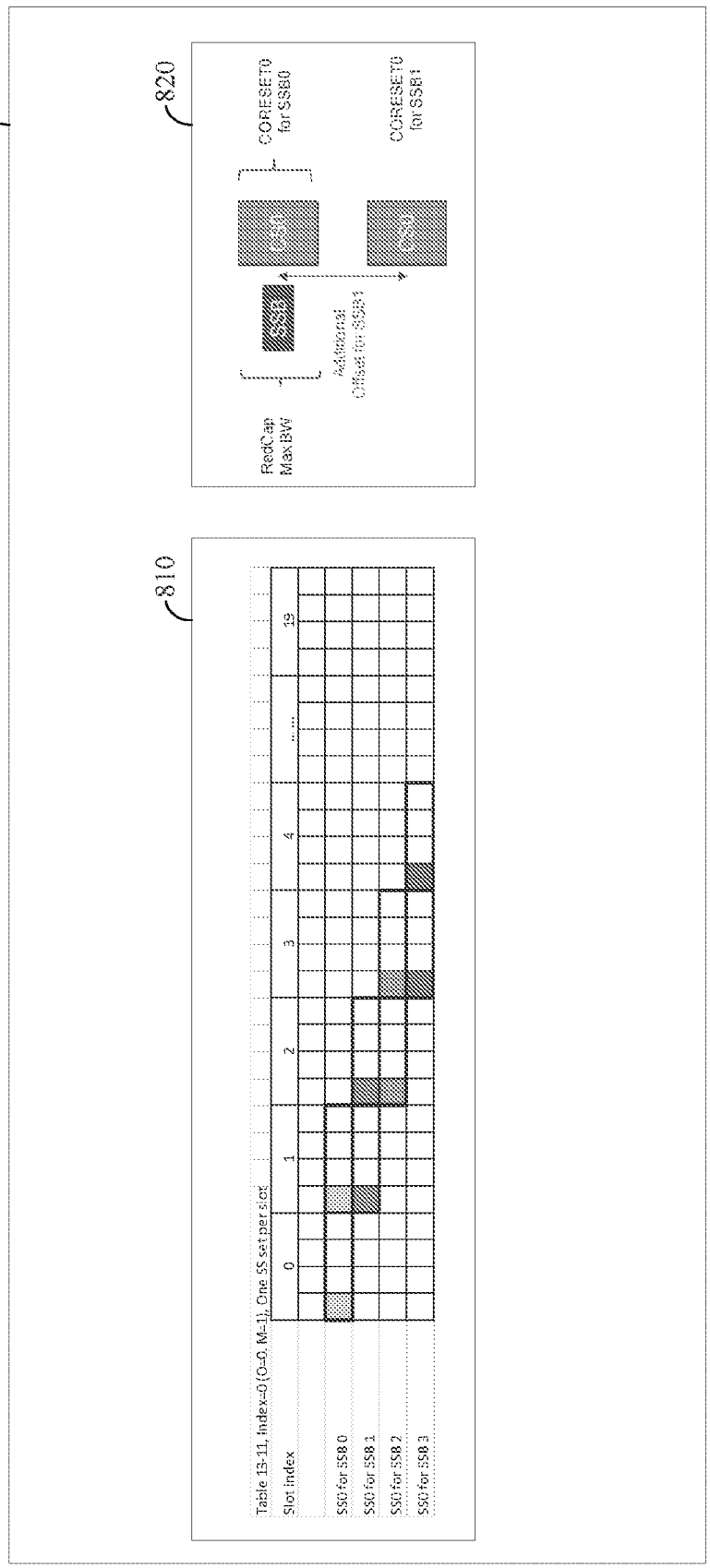
FIG. 8 depicts an example of an additional offset for PDCCH aggregation, in accordance with certain aspects of the present disclosure.

FIG. 8 depicts an example 800 of an additional offset for PDCCH aggregation, in accordance with certain aspects of the present disclosure.

For Type0-CSS, the PMOs (PDCCH monitoring occasions) associated to a certain SSB for multiplexing pattern 1 may occur in two consecutive slots every 20 ms, and the PMOs for different SSBs may be time division multiplexed (TDM), and may overlap based on configuration. For example, table 810 depicts such overlapping.

When PDCCH aggregation is used for Type0-CSS, a SSB specific CORESET offset can be used to support frequency division multiplexing (FDM) of PDCCH monitoring for different SSBs. For example, as shown in block 820, if a PMO for different SSBs overlap in the time domain, then an additional offset may be added to the CORESET0 of the other SSB to avoid the collision. The additional offset can be configured as part of a CORESET0 configuration or may be the same as the CORESET0 size.

In some embodiments, the SSB specific CORESET offset can also be applied to the PDCCH repetition case.

Figure 9:
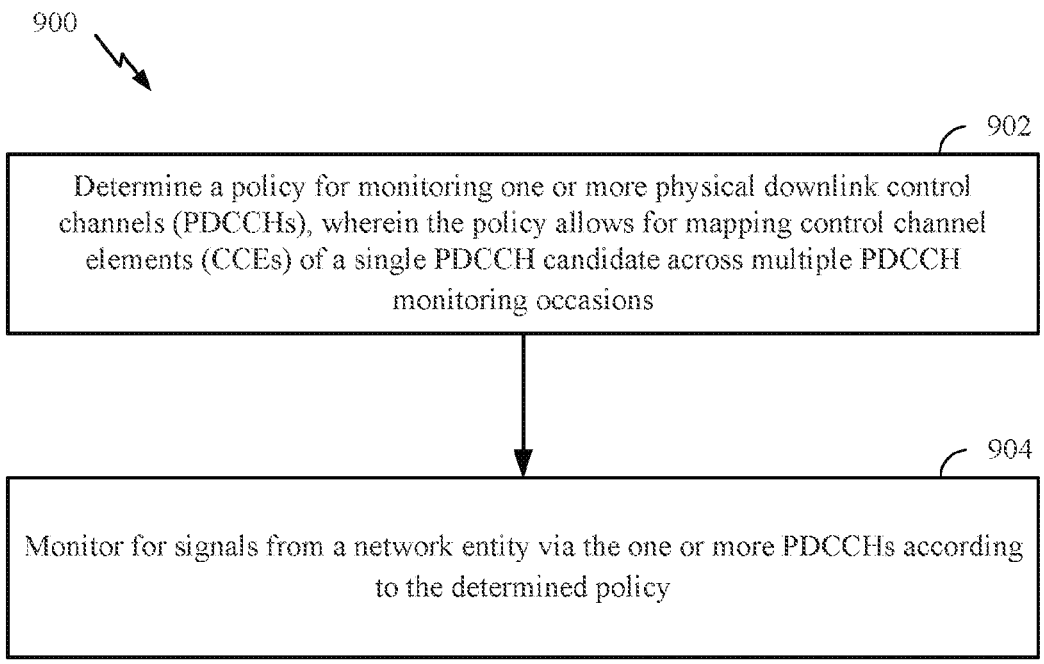
FIG. 9 is a flow diagram illustrating example operations for wireless communication by a UE, in accordance with certain aspects of the present disclosure.
Figure 10:
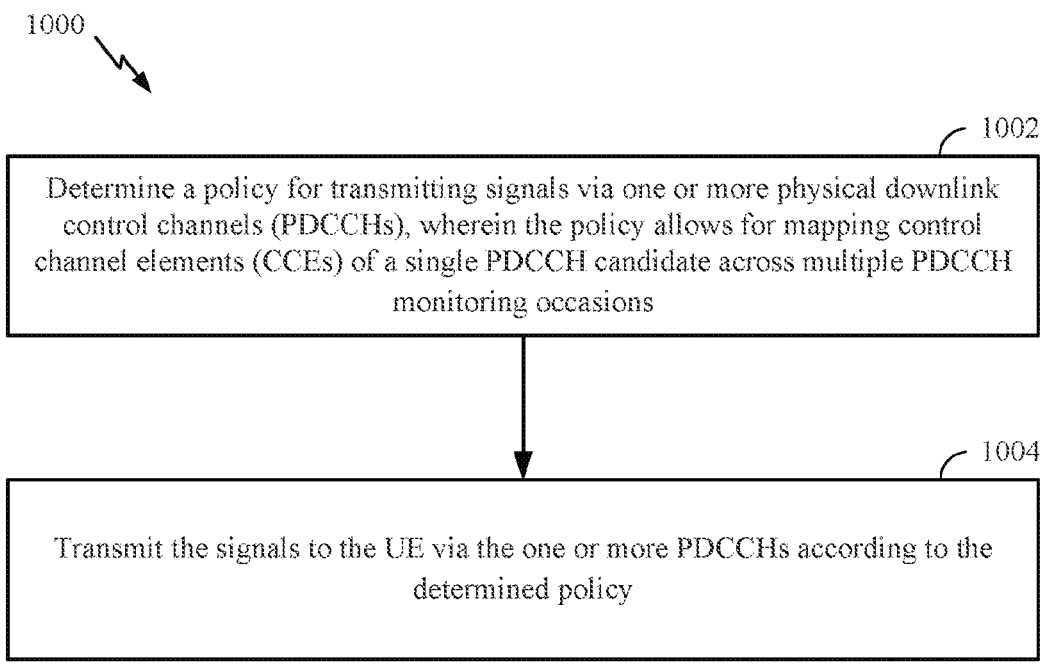
FIG. 10 is a flow diagram illustrating example operations for wireless communication by a network entity (e.g., a BS), in accordance with certain aspects of the present disclosure.

FIGS. 9 and 10 are flow diagrams depicting example operations that may be performed by a UE and BS for PDCCH aggregation across monitoring occasions as described herein. For example, operations 900 of FIG. 9 may include operations performed by UE 120 as described above with respect to FIG. 5 and operations 1000 of FIG. 10 may include operations performed by BS 110 as described above with respect to FIG. 5.

FIG. 9 is a flow diagram illustrating example operations 900 for wireless communication, in accordance with certain aspects of the present disclosure. The operations 900 may be performed, for example, by UE (e.g., the UE 120a in the wireless communication network 100). The operations 900 may be implemented as software components that are executed and run on one or more processors (e.g., controller/processor 280 of FIG. 2). Further, the transmission and reception of signals by the UE in operations 900 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals. In certain embodiments, operations 900 may be performed by UE 120 as described above with respect to FIG. 5.

The operations 900 begin at 902, where the UE determines a policy for monitoring one or more physical downlink control channels (PDCCHs), wherein the policy allows for mapping control channel elements (CCEs) of a single PDCCH candidate across multiple PDCCH monitoring occasions.

At 904, the UE monitors for signals from a network entity (e g, the BS 110) via the one or more PDCCHs according to the determined policy.

FIG. 10 is a flow diagram illustrating example operations 1000 for wireless communication, in accordance with certain aspects of the present disclosure. The operations 1000 may be performed, for example, by a network entity (e.g., the BS 110a in the wireless communication network 100). The operations 1000 may be complimentary to the operations 900 performed by the UE. The operations 1000 may be implemented as software components that are executed and run on one or more processors (e.g., controller/processor 240 of FIG. 2). Further, the transmission and reception of signals by the BS in operations 1000 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals. In certain embodiments, operations 1000 may be performed by BS 110 as described above with respect to FIG. 5.

The operations 1000 begin at 1002, where a network entity determines a policy for transmitting signals via one or more physical downlink control channels (PDCCHs), wherein the policy allows for mapping control channel elements (CCEs) of a single PDCCH candidate across multiple PDCCH monitoring occasions.

At 1004, the network entity may transmit the signals to the UE via the one or more PDCCHs according to the determined policy.

In some embodiments, the policy indicates that a starting CCE index for the single PDCCH candidate is based on a total number of CCEs in the multiple PDCCH monitoring occasions.

In some embodiments, the policy indicates that a starting CCE index for the single PDCCH candidate is based on a slot index of a first PDCCH monitoring occasion of the multiple PDCCH monitoring occasions.

In certain embodiments, the policy indicates that the CCEs of the single PDCCH candidate are to be aggregated in sequence across the multiple PDCCH monitoring occasions.

In some embodiments, the policy indicates that the CCEs of the single PDCCH candidate are to be interleaved with CCEs of another PDCCH candidate across the multiple PDCCH monitoring occasions.

In certain embodiments, the policy is determined based on a size of a control resource set (CORESET) and an aggregation level associated with the single PDCCH candidate.

Some embodiments further include the UE indicating via signaling to the network entity that the UE has reduced capabilities and the UE receiving the policy from the network entity in response to the signaling.

In some embodiments, the UE receives the policy via signaling from the network entity.

Certain embodiments further comprise determining, based on the policy, an additional frequency offset between CORESETs for different synchronization signal blocks (SSBs).

Some embodiments further comprise the UE monitoring one or more PDCCHs in the multiple PDCCH monitoring occasions associated with an SSB based on the additional frequency offset.

Figure 11:
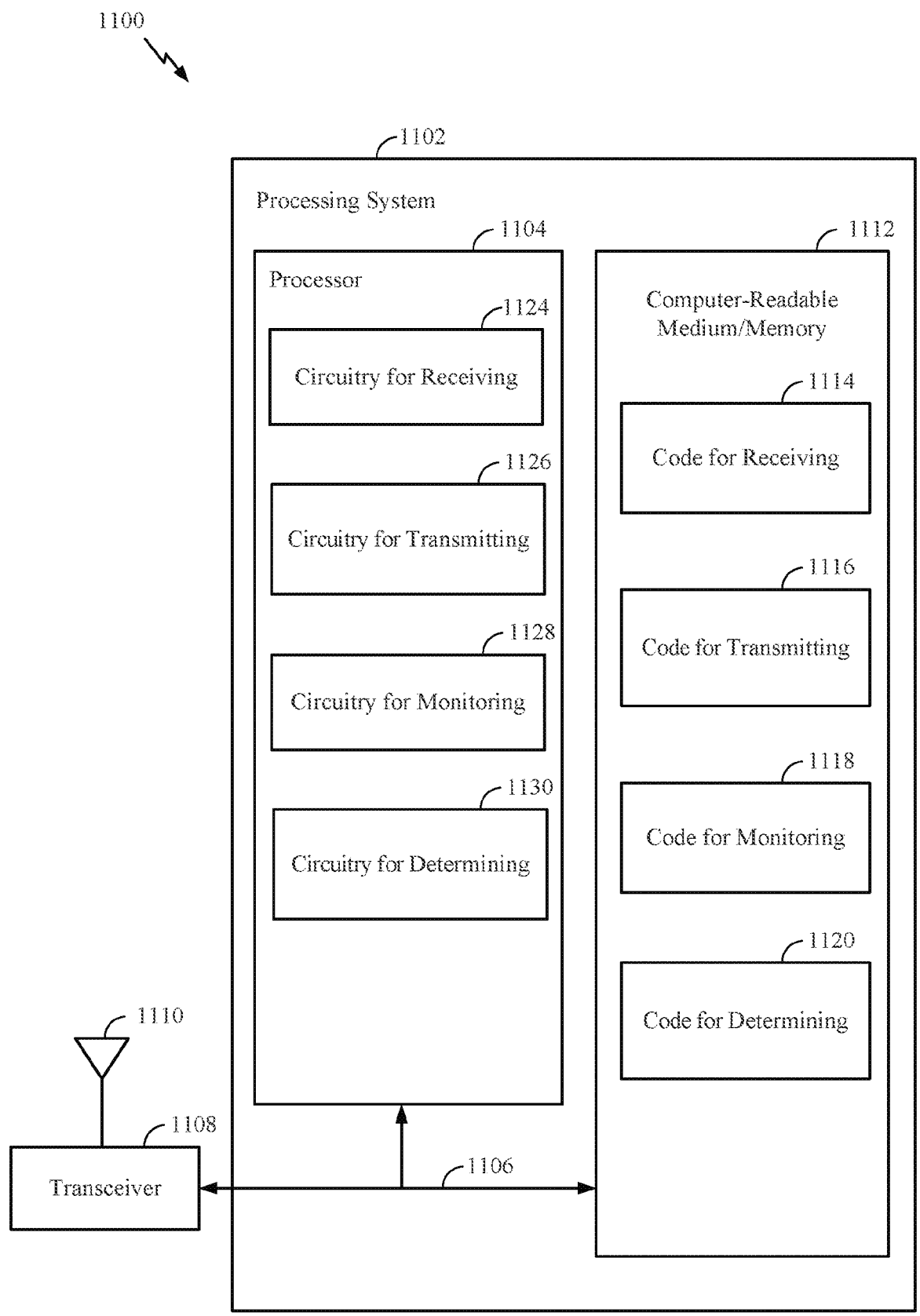
FIG. 11 illustrates a communications device (e.g., a UE or BS) that may include various components configured to perform operations for the techniques disclosed herein in accordance with aspects of the present disclosure.

FIG. 11 illustrates a communications device 1100 (e.g., a UE or BS) that may include various components (e.g., corresponding to means-plus-function components) configured to perform operations for the techniques disclosed herein, such as the operations illustrated in FIGS. 9 and 10. The communications device 1100 includes a processing system 1102 coupled to a transceiver 1108 (e.g., a transmitter and/or a receiver). The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIGS. 9 and 10, or other operations for performing the various techniques discussed herein for PDCCH aggregation across monitoring occasions. In certain aspects, computer-readable medium/memory 1112 stores code for receiving 1114, code for transmitting 1116, code for monitoring 1118, and/or code for determining 1120. In certain aspects, the processor 1104 has circuitry configured to implement the code stored in the computer-readable medium/memory 1112. The processor 1104 includes circuitry for receiving 1124, circuitry for transmitting 1126, circuitry for monitoring 1128, and/or circuitry for determining 1130.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 9 and/or FIG. 10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method of wireless communication by a user equipment (UE), comprising:
   determining a policy for monitoring one or more physical downlink control channels (PDCCHs), wherein the policy allows for mapping control channel elements (CCEs) of a single PDCCH candidate across multiple PDCCH monitoring occasions;
   monitoring for signals from a network entity via the one or more PDCCHs according to the determined policy; and
   wherein the policy indicates that a starting CCE index for the single PDCCH candidate is based on a total number of CCEs in the multiple PDCCH monitoring occasions.

2. The method of claim 1, wherein the policy is determined based on a size of a control resource set (CORESET) and an aggregation level associated with the single PDCCH candidate.

3. The method of claim 1, further comprising indicating via signaling to the network entity that the UE has reduced capabilities, wherein the policy is received from the network entity in response to the signaling.

4. The method of claim 1, wherein the policy is received via signaling from the network entity.

5. The method of claim 1, further comprising determining, based on the policy, an additional frequency offset between CORESETs for different synchronization signal blocks (SSBs).

6. The method of claim 5, further comprising monitoring one or more PDCCHs in the multiple PDCCH monitoring occasions associated with an SSB based on the additional frequency offset.

7. A method of wireless communication by a network entity, comprising:
   determining a policy for transmitting signals via one or more physical downlink control channels (PDCCHs), wherein the policy allows for mapping control channel elements (CCEs) of a single PDCCH candidate across multiple PDCCH monitoring occasions;
   transmitting the signals to a UE via the one or more PDCCHs according to the determined policy; and
   wherein the policy indicates that a starting CCE index for the single PDCCH candidate is based on a total number of CCEs in the multiple PDCCH monitoring occasions.

8. The method of claim 7, wherein the policy is determined based on a size of a control resource set (CORESET) and an aggregation level associated with the single PDCCH candidate.

9. The method of claim 7, further comprising receiving signaling from the UE indicating that the UE has reduced capabilities, wherein the policy is determined based on the signaling.

10. The method of claim 7, further comprising indicating the policy to the UE via signaling.

11. The method of claim 7, further comprising determining, based on the policy, an additional frequency offset between CORESETs for different synchronization signal blocks (SSBs).

12. An apparatus for wireless communication by a user equipment (UE), comprising:
   means for determining a policy for monitoring one or more physical downlink control channels (PDCCHs), wherein the policy allows for mapping control channel elements (CCEs) of a single PDCCH candidate across multiple PDCCH monitoring occasions;
   means for monitoring for signals from a network entity via the one or more PDCCHs according to the determined policy; and
   wherein the policy indicates that a starting CCE index for the single PDCCH candidate is based on a total number of CCEs in the multiple PDCCH monitoring occasions.

13. An apparatus for wireless communication by a network entity, comprising:
   means for determining a policy for transmitting signals via one or more physical downlink control channels (PDCCHs), wherein the policy allows for mapping control channel elements (CCEs) of a single PDCCH candidate across multiple PDCCH monitoring occasions;
   means for transmitting the signals to a UE via the one or more PDCCHs according to the determined policy; and
   wherein the policy indicates that a starting CCE index for the single PDCCH candidate is based on a total number of CCEs in the multiple PDCCH monitoring occasions.

* * * * *